United States Patent [19]
Kim

[11] Patent Number: 5,917,650
[45] Date of Patent: *Jun. 29, 1999

[54] VARIABLE MAGNIFICATION FINDER

[75] Inventor: Moon-Hyun Kim, Kyeongsangnam-do, Rep. of Korea

[73] Assignee: Samsung Aerospace Industries, Ltd., Kyeongsangnam-do, Rep. of Korea

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/652,693

[22] Filed: May 30, 1996

[30] Foreign Application Priority Data

May 30, 1995 [KR] Rep. of Korea ............... 95-13858

[51] Int. Cl.⁶ ............................................. G02B 23/00
[52] U.S. Cl. ................................. 359/432; 359/431
[58] Field of Search ........................ 359/362, 646, 359/420–422, 431–433, 676–677, 683–684, 686–687; 396/373–386

[56] References Cited

U.S. PATENT DOCUMENTS

| 4,840,469 | 6/1989 | Moriyama | 359/685 |
|---|---|---|---|
| 4,842,395 | 6/1989 | Sato et al. | 359/421 |
| 5,054,897 | 10/1991 | Ozawa | 359/691 |
| 5,168,402 | 12/1992 | Mihara | 359/684 |
| 5,193,030 | 3/1993 | Nozaki et al. | 359/687 |
| 5,247,324 | 9/1993 | Estelle | 359/676 |
| 5,309,285 | 5/1994 | Ito | 359/692 |
| 5,313,327 | 5/1994 | Ito et al. | 359/646 |
| 5,325,236 | 6/1994 | Tanaka | 359/684 |
| 5,327,291 | 7/1994 | Baker et al. | 359/716 |
| 5,448,400 | 9/1995 | Kikuchi et al. | 359/432 |
| 5,555,431 | 9/1996 | Kim | 359/676 |
| 5,687,023 | 11/1997 | Ohshita | 359/432 |
| 5,701,199 | 12/1997 | Takato | 359/432 |
| 5,717,521 | 2/1998 | Kim | 359/380 |
| 5,721,638 | 2/1998 | Kim | 359/432 |

FOREIGN PATENT DOCUMENTS

| 61-156018 | 7/1986 | Japan . |
|---|---|---|
| 6-18780 | 1/1994 | Japan . |
| 6-51197 | 2/1994 | Japan . |
| 6-102454 | 4/1994 | Japan . |

OTHER PUBLICATIONS

English Abstract of Japan Application No. 61–156018.
English Abstract of Japan Application No. 6–51197.
English Abstract of Japan Application No. 6–18780.
English Abstract of Japan Application No. 6–102454.

*Primary Examiner*—Thong Nguyen
*Attorney, Agent, or Firm*—Finnegan, Henderson, Farabow, Garrett & Dunner, L.L.P.

[57] ABSTRACT

The present invention relates to a variable magnification finder comprising an objective lens group having a positive refractive power for enabling a wide angle view of an object. The objective lens group includes a first lens sub-group having either a negative or a positive refractive power; a second lens sub-group having a negative refractive power; a third lens sub-group having a positive refractive power and having a cemented lens with at least two pieces; and a fourth lens sub-group having a positive refractive power. The third lens sub-group is movable for magnifying the image, and the second lens sub-group is movable for compensating the focus of the magnified image. The finder further comprises an eyepiece lens group having a positive refractive power for viewing the image.

6 Claims, 8 Drawing Sheets

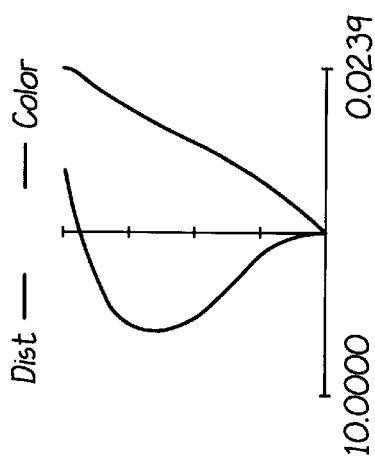
Fig.2C
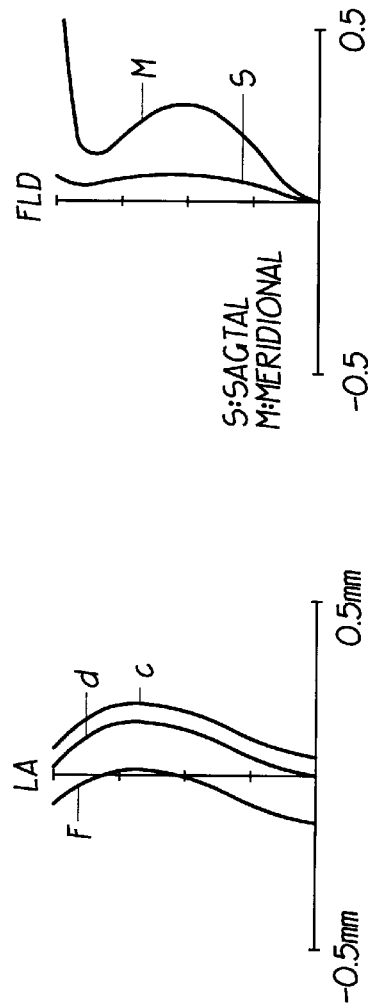
Fig.2B
Fig.2A
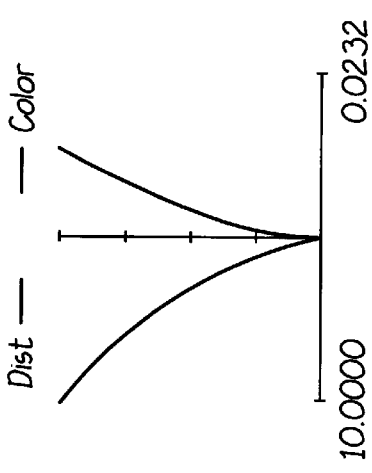
Fig.2F
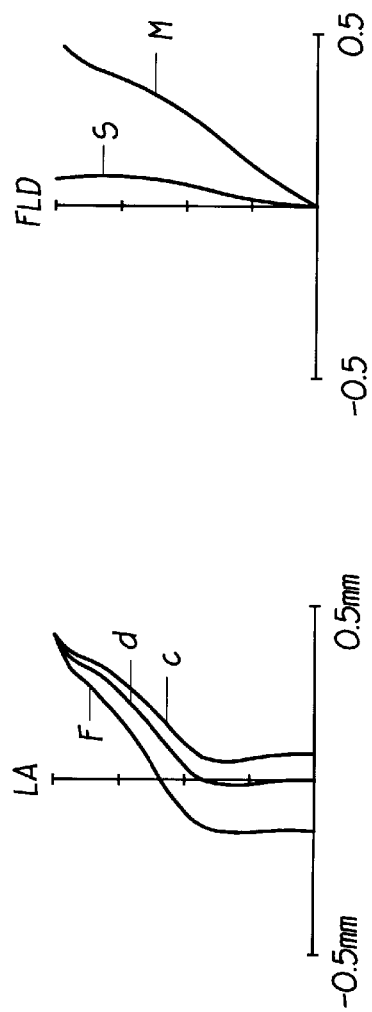
Fig.2E
Fig.2D

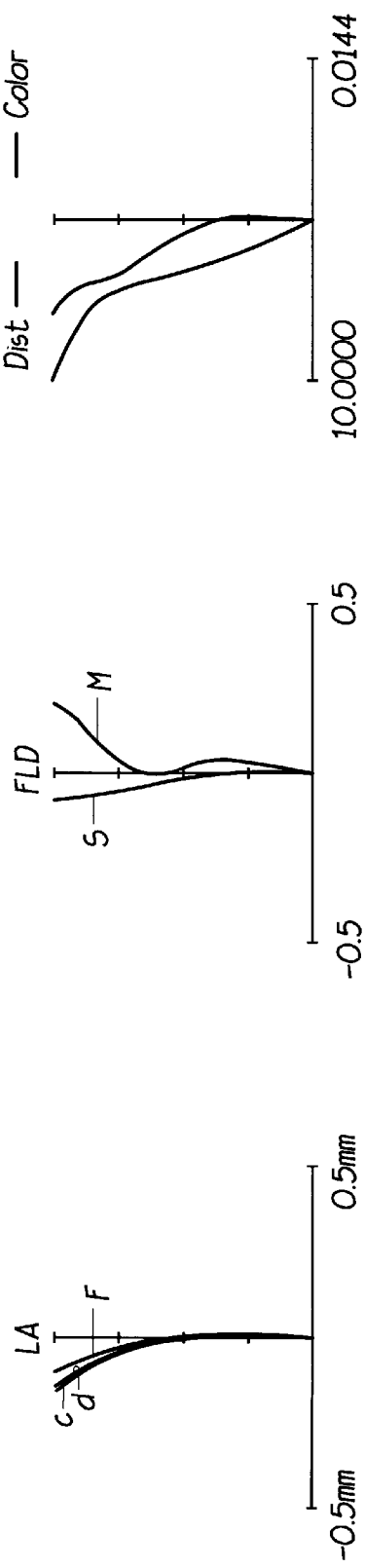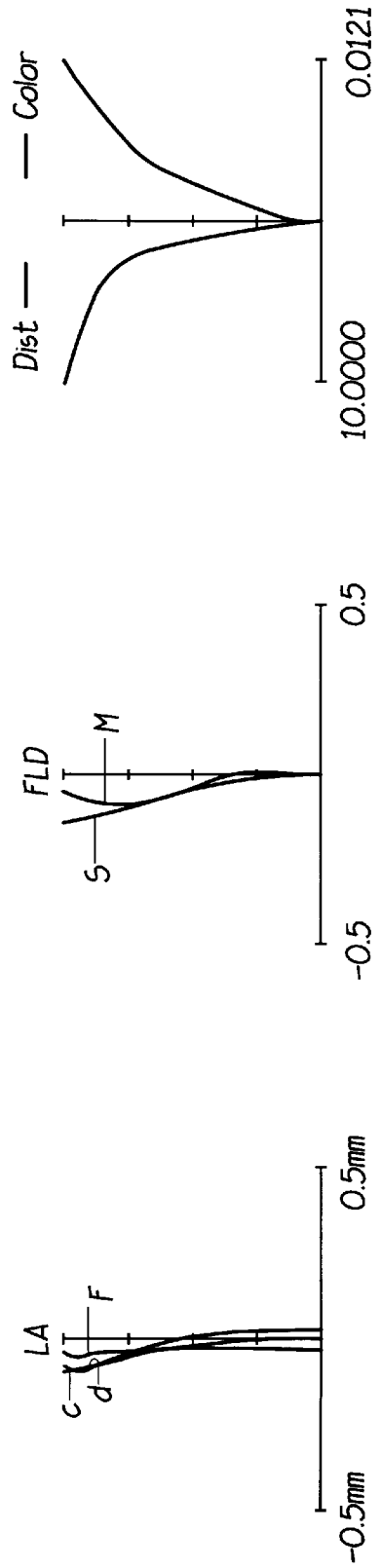

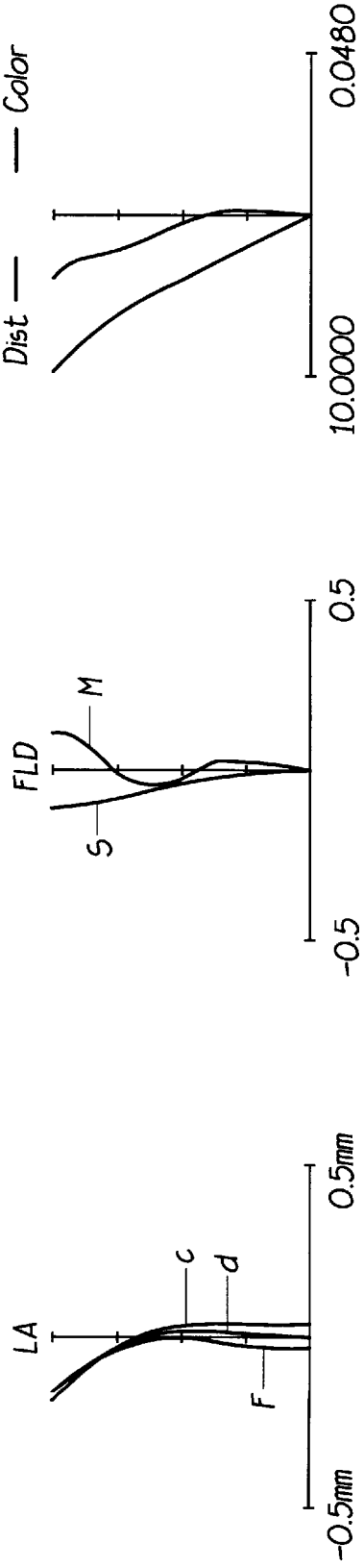
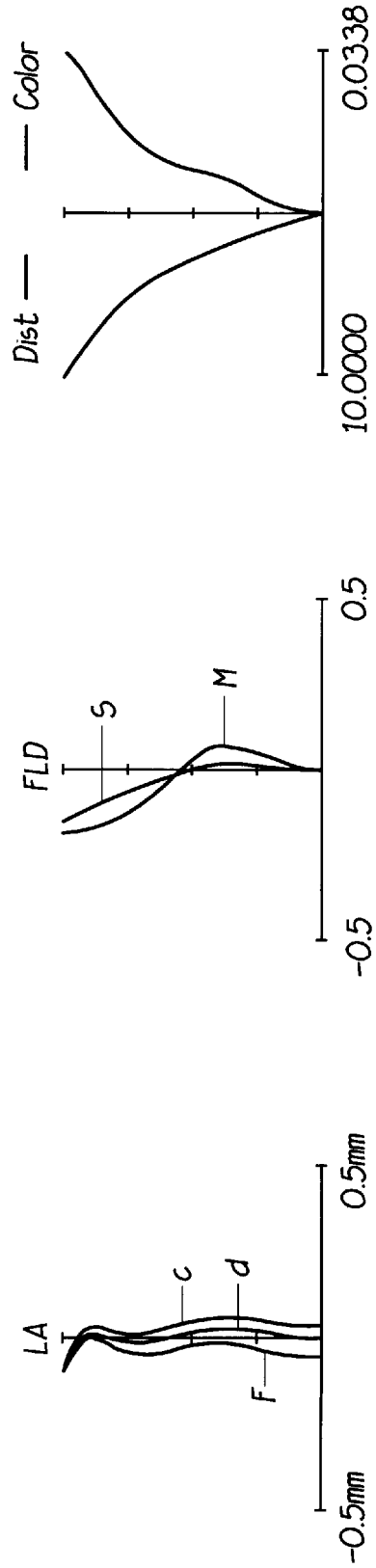

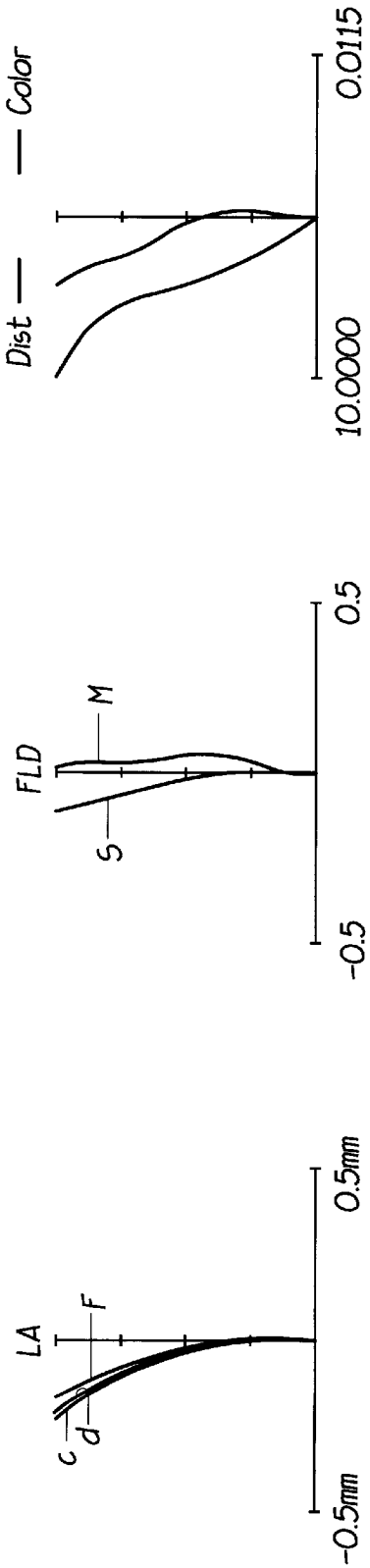
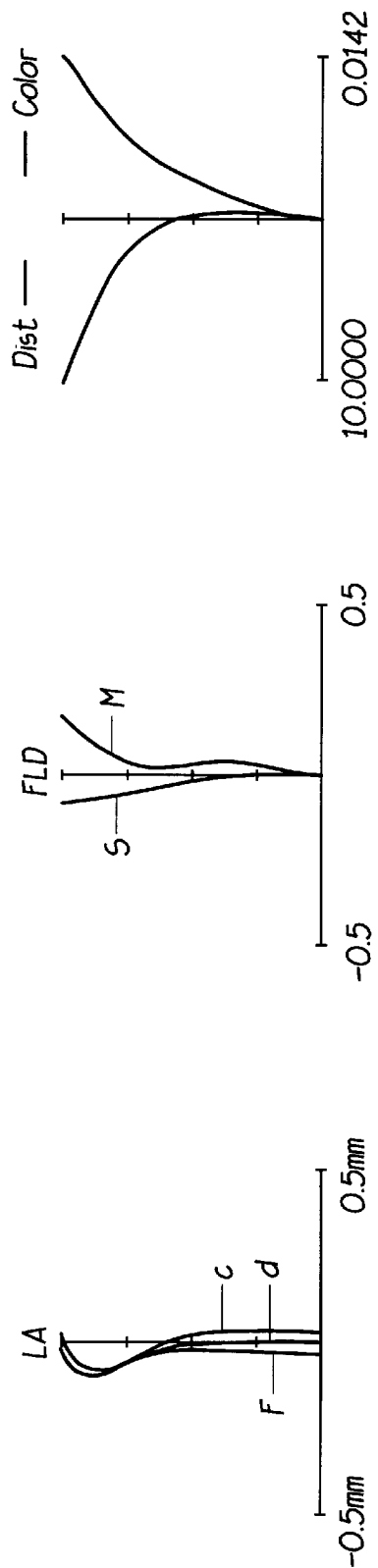

VARIABLE MAGNIFICATION FINDER

BACKGROUND OF THE INVENTION

1. Field of the Invention

The present invention relates to a variable magnification finder. More particularly, the present invention relates to a compact variable magnification finder that can obtain a wide angle view for a real image finder optical system of a camera or a video camera.

2. Description of the Prior Art

Conventionally, most compact cameras employ a virtual image finder such as an Albada finder or an inverse Galilean finder. Such finders provide a relatively wide angle view and have a compact construction because they do not require a prism for erecting the image. However, in such finders, the lens closest to an object must be large and the view field of the finder blurs in the marginal zone.

Recently, because of the above-mentioned drawbacks, real image finders are employed instead of virtual image finders. Therefore, real image optical system is more relevant to developing a picture-taking lens of a compact camera with a wide angle view.

Real image finders are disclosed in U.S. Pat. No. 4,842, 395 entitled "FINDER OF VARIABLE MAGNIFICATION," Japanese Laid-open Patent No. SH061-156018 entitled "Variable Magnification Finder," Laid-open Patent No. PYEONG 6-51197 entitled "Real Image Finder," Laid-open Patent No. PYEONG 6-18780 entitled "Variable Magnification Finder Optical System," and patent application No. PYEONG 6-102454 discloses an objective lens group comprising four lens groups which perform variable magnification and compensation by moving a second lens group and a third lens group.

In the above-mentioned real image finder optical systems, an objective lens group and a condenser lens group form an image of an object, and the enlarged image of an object is observed through an eyepiece group.

When a real image finder optical system is compact, a wide angle view may be achieved if an image formed through the objective lens is small by shortening the focal distance of the objective lens at a wide angle position.

However, the refractive power of the objective lens increases as the focal distance of the objective lens decreases, so that it is difficult to compensate for aberrations.

SUMMARY OF THE INVENTION

Accordingly, an object of the present invention is to provide a compact variable magnification finder which enables a wide angle view and has a compensated chromatic aberration with a relatively simple construction.

In order to achieve the above object, the present invention provides a variable magnification finder with an objective lens group having a positive refractive power for enabling a wide angle view of an object where the objective lens group includes four sub-groups. The first lens sub-group has either a negative or a positive refractive power and the second lens sub-group has a negative refractive power. The third lens sub-group has a positive refractive power and has a junction lens with at least two pieces, and the fourth lens sub-group has a positive refractive power. The third lens sub-group is movable for magnifying the image, and the second lens sub-group is movable for compensating the focus of the magnified image of the variable magnification finder. The variable magnification finder further includes an eyepiece lens group having a positive refractive power for viewing the image.

BRIEF DESCRIPTION OF THE DRAWINGS

FIGS. 2A–2C are diagrams showing a spherical aberration, astigmatism, and distortion aberration, respectively, of a variable magnification finder optical system in accordance with a first preferred embodiment of the present invention;

FIGS. 2D–2F are diagrams showing a spherical aberration, astigmatism, and distortion aberration, respectively, of a variable magnification finder telescope system in accordance with a first preferred embodiment of the present invention;

FIGS. 4A–4C are diagrams showing a spherical aberration, astigmatism, and distortion aberration, respectively, of a variable magnification finder optical system in accordance with a second preferred embodiment of the present invention;

FIGS. 4D–4F are diagrams showing a spherical aberration, astigmatism, and distortion aberration, respectively, of a variable magnification finder telescope system in accordance with a second preferred embodiment of the present invention;

FIGS. 6A–6C are diagrams showing a spherical aberration, astigmatism, and distortion aberration, respectively, of a variable magnification finder optical system in accordance with a third preferred embodiment of the present invention;

FIGS. 6D–6F are diagrams showing a spherical aberration, astigmatism, and distortion aberration, respectively, of a variable magnification finder telescope system in accordance with a third preferred embodiment of the present invention;

FIGS. 8A–8C are diagrams showing a spherical aberration, astigmatism, and distortion aberration, respectively, of a variable magnification finder optical system in accordance with a fourth preferred embodiment of the present invention; and FIGS. 8D–8F are diagrams showing a spherical aberration, astigmatism, and distortion aberration, respectively, of a variable magnification finder telescope system in accordance with a fourth preferred embodiment of the present invention.

DETAILED DESCRIPTION OF THE PREFERRED EMBODIMENTS

Figure 1A:
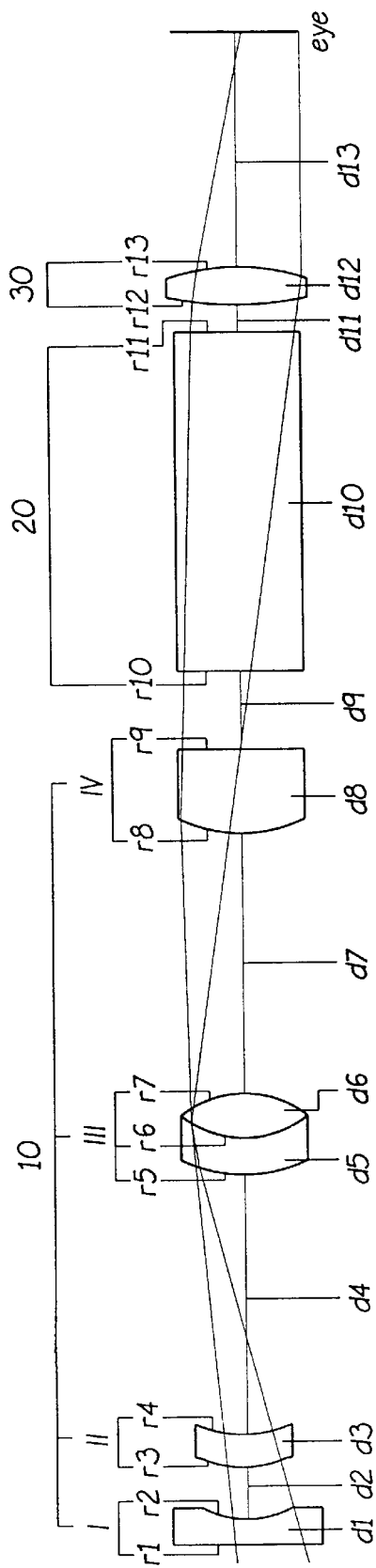
FIG. 1A is a schematic sectional view of the lens groups of a variable magnification finder optical system in accordance with a first preferred embodiment of the present invention.

Preferred embodiments of the present invention will become apparent from the following detailed description, when viewed in light of the accompanying drawings.

As shown in FIGS. 1A, 1B, 3A, 3B, SA, 5B, 7A, and 7B, a variable magnification finder in accordance with each preferred embodiment of the present invention comprises an objective lens group 10 having a positive refractive power, an eyepiece lens group 30 having a positive refractive power, and a prism 20, mounted between the objective lens group 10 and eyepiece lens group 30, for erecting the image.

Objective lens group 10 comprises a fixed first lens subgroup I having a positive or negative refractive power, a movable second lens sub-group II having a negative refractive power, a movable third lens sub-group III having a positive refractive power and a fixed fourth lens sub-group IV having a positive refractive power.

Objective lens group 10 changes magnification by moving lens sub-group III as a variable magnification finder section and compensates aberration change resulting from the above-mentioned magnification change by moving lens group II as a compensation section.

Lens sub-group III includes a cemented lens having at least two pieces (preferred embodiments 1–4).

More specifically, lens sub-group III includes a cemented two piece plastic lens (preferred embodiment 1); a cemented plastic lens and a glass lens (preferred embodiment 2); a cemented two piece glass lens and one piece of plastic lens (preferred embodiment 3); and a cemented two piece and another plastic lens (preferred embodiment 4).

The operation of a variable magnification finder whose construction is described above is explained as follows.

To achieve an acceptable aberration compensation for chromatic aberration throughout an overall range of variable magnification and to shorten a change of aberration resulting from a variable magnification with a relatively simple lens construction, refractive power must be distributed by dividing an objective lens group into several groups, i.e., variable magnification section, a compensation section, and an image formation section.

Particularly, to compensate for chromatic aberration, a variable magnification section which is very sensitive to chromatic aberration must comprise cemented lenses, each having different refractive powers in addition to distribution of refractive power into each group.

Generally, a cemented lens group of a variable magnification section compensates chromatic aberration by joining at least one lens having a positive refractive power and at least one lens having a negative refractive power.

If a variable magnification section has a positive refractive power, a negative refractive power is joined with the positive refractive power, so that the variable magnification section compensates chromatic aberration by making the positive refractive power larger than the negative refractive power.

An amount of a chromatic aberration is generally expressed in the following equation.

$$CA = \frac{\Phi 1}{v1} + \frac{\Phi 2}{v1}$$

CA: a chromatic aberration amount $\Phi 1$: a power of a first lens of a variable magnification section v1: Abbe number of a first lens of a variable magnification section $\Phi 2$: a power of a second lens of a variable magnification section v2: Abbe number of a second lens of a variable magnification section The chromatic aberration amount CA, as stated in the above equation, increases when the value of positive refractive power $\Phi 1$ is larger than the value of a negative refractive power $\Phi 2$, so that refractive power of a variable magnification section $\Phi 1 + \Phi 2$ has a positive value.

Therefore, in order to decrease the chromatic aberration amount CA, an Abbe number of a first lens v1 having a positive refractive power must become large and an Abbe number of a second lens v2 having a negative refractive power must be small.

In other words, a first lens must be made of crown material and a second lens must be made of flint material.

Accordingly, chromatic aberration becomes small as chromatic aberration amount is close to zero.

If a variable magnification section has a negative refractive power, a lens is constructed by selecting materials with characteristics opposite the above mentioned description.

In other words, chromatic aberration must be compensated by selecting materials which make an Abbe number of a first lens small and an Abbe number of a second lens large in order to reduce the chromatic aberration amount CA.

A coefficient of an aspherical lens of each lens in accordance with a preferred embodiment which satisfies the above conditions is expressed by the following equation.

$$X = \frac{CYA^2}{1 + \{1 - (K+1)C^2 y^2\}^{1/2}} + A_4 Y^2 + A_6 Y^2 + A_8 Y^8 + A_{10} Y^{10}$$

X: optical axial thickness from the lens vertex
y: vertical thickness of the optical axis
C: reciprocal of the radius of curvature
K: conic number
$A_4, A_6, A_8, A_{10}$: aspherical coefficients The construction of a lens which satisfies the above-mentioned conditions and values is described below.

Figure 1B:
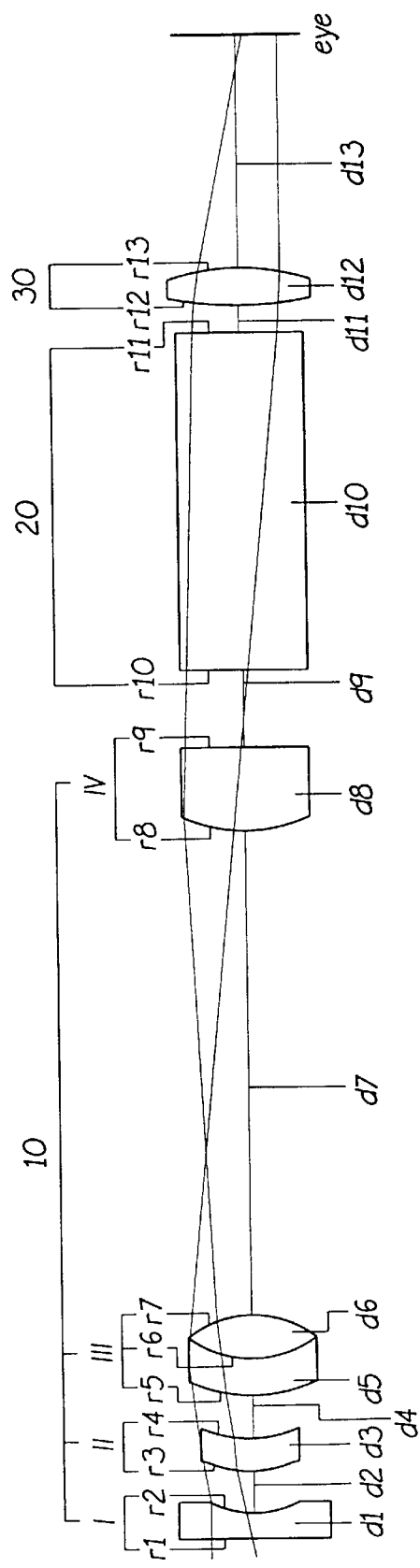
FIG. 1B is a schematic sectional view of the lens groups of a variable magnification finder telescope system in accordance with a first preferred embodiment of the present invention.

As shown in FIGS. 1A and 1B, a variable magnification finder in accordance with a first preferred embodiment of the present invention comprises objective lens group 10, prism 20, and eyepiece lens group 30. Also, objective lens group 10 includes four lens sub-groups, I, II, III, and IV, and lens sub-group III comprises a cemented lens of two plastic pieces.

Values for the first preferred embodiment of the present invention are shown in table 1.

A radius of curvature of a refractive surface equals $r_1$, a thickness of lens or a distance between lenses equals $d_1$, (I= 1–19), a d-line refractive index of a lens equals N, an Abbe number of a lens equals v, a magnification of an overall lens system equals m and a half viewing angle equals W.

In accordance with a first preferred embodiment of the present invention, a diagram value of a viewing angle of a variable magnification finder 2W is 65.24°~23.72° and magnification is ~0.33~0.90.

TABLE 1

| surface number | radius of a curvature ($r_i$) | thickness ($d_i$) | refractive index (N) | Abbe number (v) |
|---|---|---|---|---|
| 1 | 135.499 | 1.50 | 1.49200 | 57.4 |
| 2 | 12.026 | variable | | |
| 3 | 11.632 | 1.84 | 1.49200 | 57.4 |
| 4 | 6.530 | variable | | |
| 5 | 15.400 | 0.9 | 1.58700 | 31.0 |
| 6 | 9.000 | 5.1 | 1.49200 | 57.4 |
| 7 | −8.420 | variable | | |
| 8 | 20.480 | 4.90 | 1.49200 | 57.4 |
| 9 | ∞ | 4.80 | | |
| 10 | ∞ | 25.10 | 1.49200 | 57.4 |
| 11 | ∞ | 1.40 | | |
| 12 | 26.432 | 2.13 | 1.49200 | 57.4 |
| 13 | −20.524 | 17.48 | | |
| 14 | ∞ | | | |

In the first preferred embodiment of the present invention, the above-mentioned thickness of lens or distance between lenses vary according to a view angle as follows.

| | 2w = 65.2° | 2w = 31.8° | 2w = 23.7° |
|---|---|---|---|
| d2 | 3.300 | 6.864 | 2.761 |
| d4 | 15.109 | 4.318 | 2.224 |
| d7 | 15.255 | 22.482 | 28.679 |

| | aspherical coefficient of a second surface | aspherical coefficient of a third surface |
|---|---|---|
| K | 0.619777 | 0.4992116E |
| A4 | 0.1906919E−3 | −0.2318559E−2 |
| A6 | −0.5301008E−4 | −0.8585752E−4 |
| A8 | 0.8578080E−6 | 0.291292BE−5 |
| A10 | −0.3970000E−8 | −0.1581000E−6 |

| | aspherical coefficient of the fourth surface | aspherical coefficient of the fifth surface | aspherical coefficient of the twelfth surface |
|---|---|---|---|
| K | −0.784158E | −0.3280350E+2 | −0.7000000E |
| A4 | −0.4786413E−13 | 0.3037277E−3 | 0 |
| A6 | −0.3573633E−6 | −0.1407511E−4 | 0 |
| A8 | −0.6426686E−6 | 0.1409382F−6 | 0 |
| A10 | 0.5594403E−7 | 0.1230796E−8 | 0 |

Figure 3A:
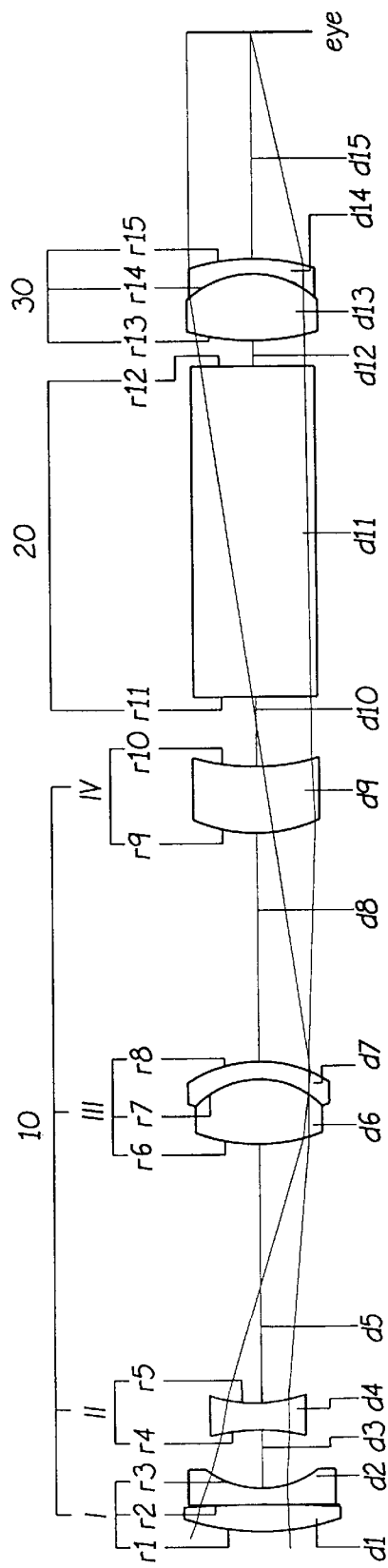
FIG. 3A is a schematic sectional view of the lens groups of a variable magnification finder optical system in accordance with a second preferred embodiment of the present invention.
Figure 3B:
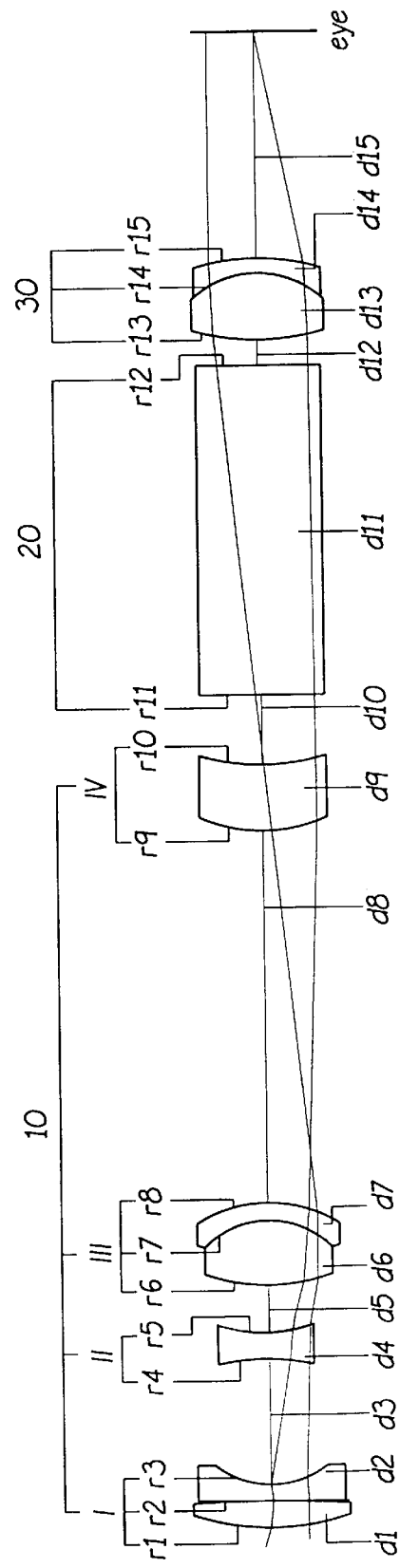
FIG. 3B is a schematic sectional view of lens of a variable magnification finder telescope system in accordance with a second preferred embodiment of the present invention.

As shown in FIGS. 3A and 3B, a variable magnification finder in accordance with a second preferred embodiment of the present invention comprises objective lens group 10, prism 20 and eyepiece lens group 30. Also, objective lens group 10 includes four lens sub-groups, I, II, III, and IV.

As mentioned above, lens sub-group I includes a two piece cemented lens and lens sub-group III comprises a cemented lens of one glass piece and one plastic piece.

Values for the second preferred embodiment of the present invention are shown in table 2.

In accordance with a second preferred embodiment of the present invention, a diagram value of a viewing angle of a variable magnification finder 2W is 54.2°~23.7° and magnification is ~0.404~0.898.

TABLE 2

| surface number | radius of a curvature | thickness (d) | refractive Index(N) | an Abbe number(v) |
|---|---|---|---|---|
| 1 | 24.666 | 1.74 | 1.78472 | 25.7 |
| 2 | 96.194 | 0.80 | 1.48749 | 70.4 |
| 3 | 9.218 | variable | | |
| 4 | −40.89 | 2.15 | 1.49200 | 57.4 |
| 5 | 36.369 | variable | | |
| 6 | 14.526 | 4.64 | 1.49200 | 57.4 |
| 7 | −7.692 | 0.80 | 1.84666 | 23.8 |
| 8 | −10.728 | variable | | |
| 9 | 13.312 | 4.50 | 1.49200 | 57.4 |
| 10 | 31.676 | 5.12 | | |
| 11 | ∞ | 26.40 | 1.51680 | 64.2 |
| 12 | ∞ | 2.20 | | |
| 13 | 30.292 | 4.47 | 1.67003 | 47.2 |
| 14 | −8.184 | 1.00 | 1.74077 | 27.8 |
| 15 | −24.237 | 19.00 | | |
| 16 | ∞ | | | |

In the second preferred embodiment of the present invention, the above-mentioned thickness of lens or distance between lenses vary according to a view angle as follows.

| | 2w = 54.2° | 2w = 27.8° | 2w = 23.7° |
|---|---|---|---|
| d3 | 2.962 | 9.000 | 7.967 |
| d5 | 19.505 | 8.915 | 2.500 |
| d8 | 15.497 | 20.048 | 27.497 |

| | aspherical coefficient of the fifth surface | aspherical coefficient of the sixth surface | aspherical coefficient of the ninth surface |
|---|---|---|---|
| K | 0.61041081E0 | −0.15643027E+2 | −0.21607242E0 |
| A4 | −0.29145657E−3 | 0.37409431E−3 | −0.12394355E−3 |
| A6 | −0.11035981E−4 | −0.92771152E−5 | 0.18165015E−4 |
| A8 | 0.14217520E−5 | 0.14501134E−6 | −0.10712869E−5 |
| A10 | −0.67993762E−7 | −0.98641230E−9 | 0.17124611E−7 |

Figure 5A:
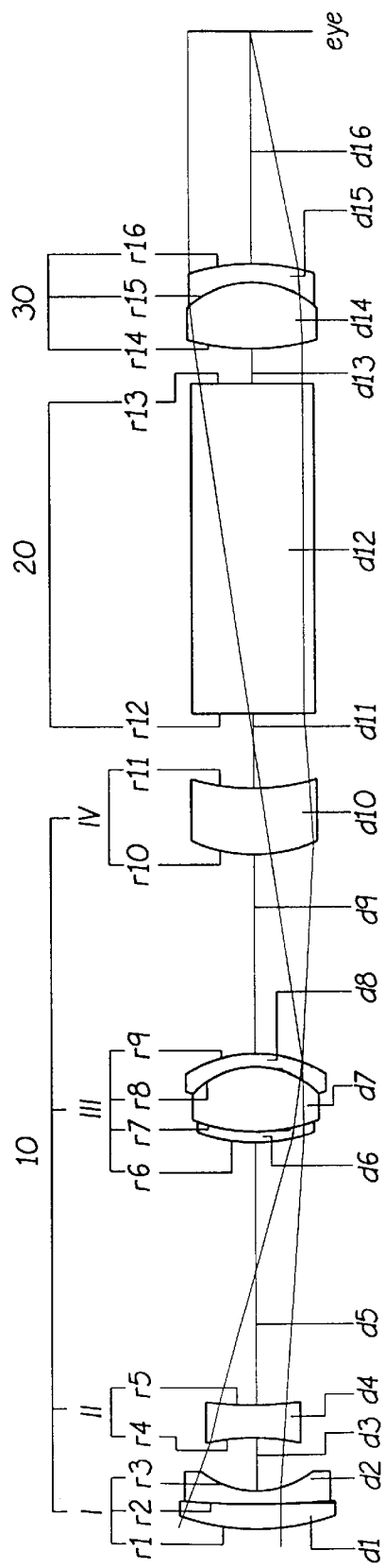
FIG. 5A is a schematic sectional view of the lens groups of a variable magnification finder optical system in accordance with a third preferred embodiment of the present invention.
Figure 5B:
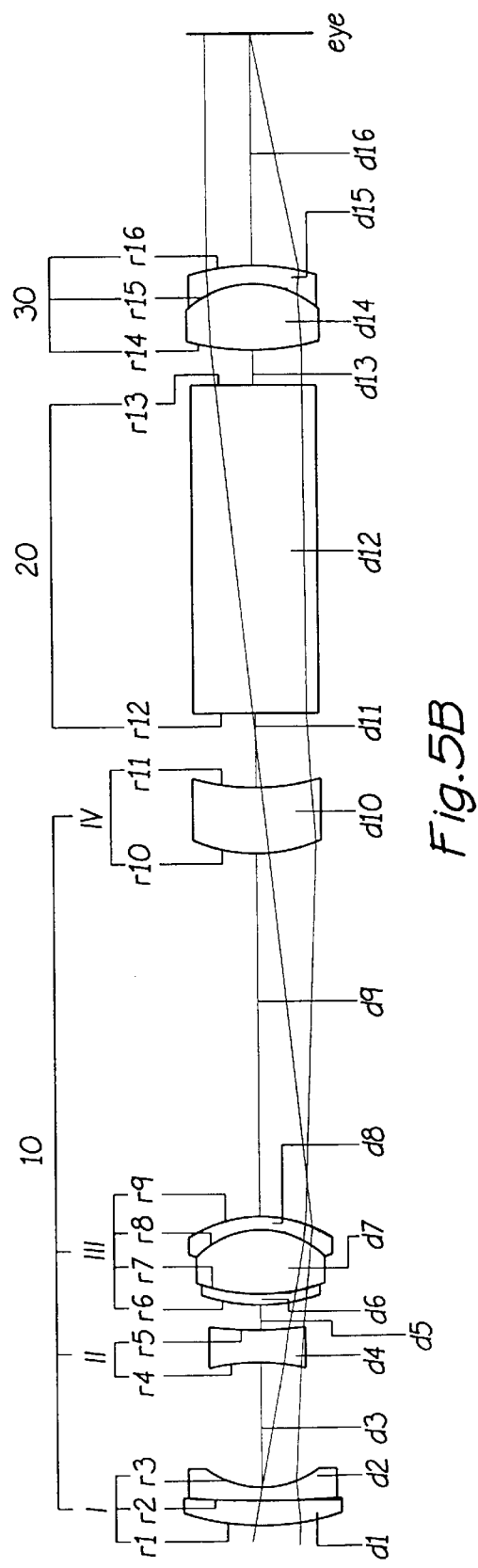
FIG. 5B is a schematic sectional view of the lens groups of a variable magnification finder telescope system in accordance with a third preferred embodiment of the present invention.

As shown in FIGS. 5A and 5B, a variable magnification finder in accordance with a third preferred embodiment of the present invention comprises objective lens group 10, prism 20 and eyepiece lens group 30. Also, objective lens group 10 includes four lens sub-groups I, II, III and IV.

As mentioned above, the lens sub-group I comprises a two piece cemented lens and lens sub-group III comprises a cemented lens of two glass pieces and one plastic piece.

Also, eyepiece lens group 30 includes a cemented lens of two pieces.

Values for the third preferred embodiment of the present invention are shown in the table 3.

In accordance with a third preferred embodiment of the variable magnification finder 2W is 54.2°~23.7° and magnification is ~0.409~0.898.

TABLE 3

| surface number | radius of a curvature | thickness (d) | refractive index (N) | an Abbe number(v) |
|---|---|---|---|---|
| 1 | 27.632 | 1.75 | 1.78742 | 25.7 |
| 2 | −282.368 | 0.80 | 1.48749 | 70.4 |
| 3 | 9.880 | variable | | |
| 4 | −22.748 | 2.24 | 1.49200 | 57.4 |
| 5 | 51.113 | variable | | |
| 6 | 14.780 | 0.04 | 1.49200 | 57.4 |
| 7 | 17.129 | 5.00 | 1.51680 | 64.2 |
| 8 | −7.707 | 1.27 | 1.84666 | 23.8 |
| 9 | 11.169 | variable | | |
| 10 | 13.171 | 4.50 | 1.49200 | 57.4 |

TABLE 3-continued

| surface number | radius of a curvature | thickness (d) | refractive index (N) | an Abbe number(v) |
|---|---|---|---|---|
| 11 | 30.402 | 5.13 | | |
| 12 | ∞ | 26.40 | 1.51680 | 64.2 |
| 13 | ∞ | 2.20 | | |
| 14 | 30.292 | 4.47 | 1.67003 | 47.2 |
| 15 | −8.184 | 1.00 | 1.74077 | 27.8 |
| 16 | −24.237 | 19.00 | | |
| 17 | ∞ | | | |

In the third preferred embodiment of the present invention, the above-mentioned thickness of lens or distance between lens vary according to a view angle as follows:

| | 2w = 54.2° | 2w = 27.8° | 2w = 23.7° |
|---|---|---|---|
| d3 | 3.400 | 8.103 | 6.906 |
| d5 | 17.962 | 8.946 | 2.665 |
| d8 | 15.495 | 19.809 | 27.285 |
| | aspherical coefficient of the fifth surface | aspherical coefficient of the sixth surface | aspherical coefficient of the ninth surface |
| K | −0.10626751E+3 | −0.77322103E | −0.21656963E |
| A4 | −0.26040794E−13 | 0.67306393E−4 | −0.18566387E−3 |
| A6 | 0.10436942E−4 | 0.24471809E−5 | 0.15810196E−4 |
| A8 | −0.71756008E−6 | −0.17205113E−6 | −0.86883071E−6 |
| A10 | 0.94420121E−8 | 0.3000e187E−8 | 0.12740654E−7 |

Figure 7A:
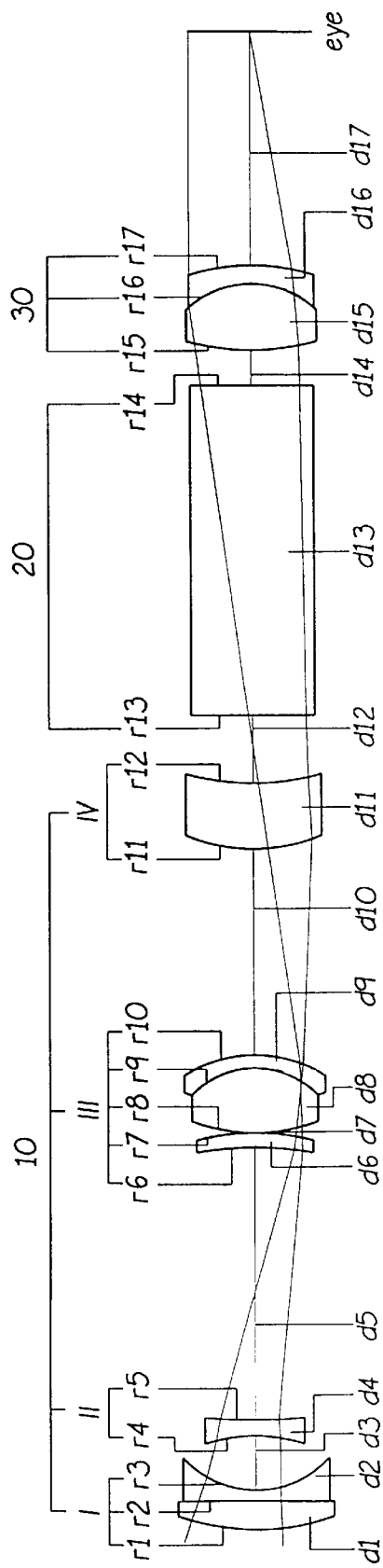
FIG. 7A is a schematic sectional view of the lens groups of a variable magnification finder optical system in accordance with a fourth preferred embodiment of the present invention.
Figure 7B:
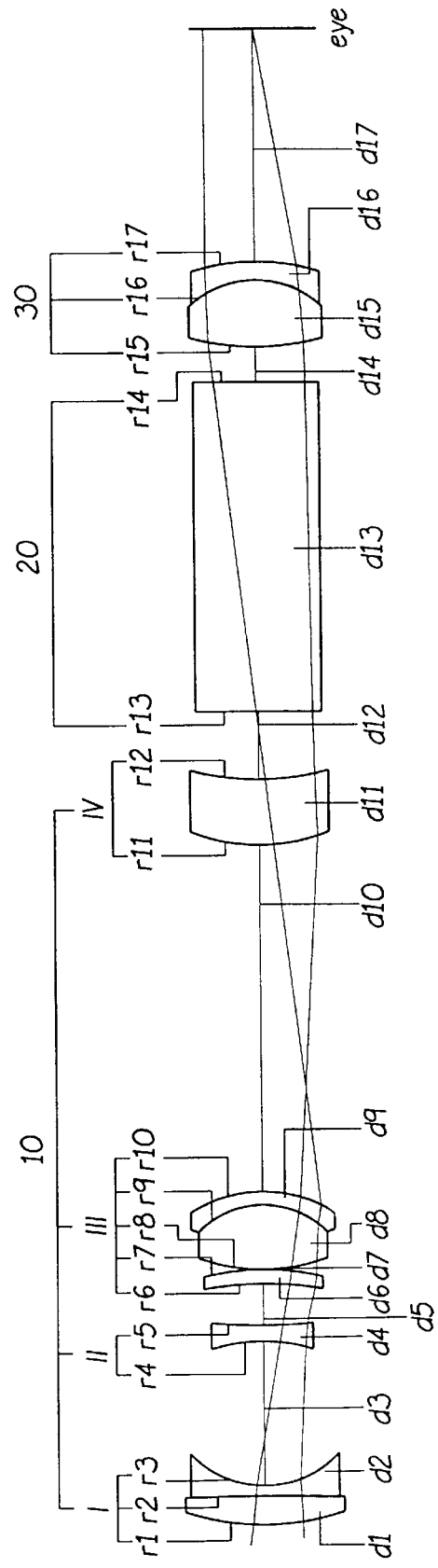
FIG. 7B is a schematic sectional view of the lens groups of a variable magnification finder telescope system in accordance with a fourth preferred embodiment of the present invention.

As shown in FIGS. 7A and 7B, a variable magnification finder in accordance with a fourth preferred embodiment or the present invention comprises objective lens group 10, prism 20, and eyepiece group 30.

As mentioned above, objective lens group 10 includes four lens sub-groups, I, II, III, and IV, and lens sub-group I includes a two piece cemented lens.

Also, lens sub-group III includes a cemented lens of two pieces and another plastic lens.

Eyepiece lens group 30 includes a cemented lens of two pieces.

Values for the fourth preferred embodiment of the present invention are shown in table 4.

In accordance with a fourth preferred embodiment of the present invention, and a value of a viewing angle of a variable magnification finder 2W is 54.2°~23.7° and magnification is ~0.401~0.900.

TABLE 4

| surface number | radius of a curvature | thickness (d) | refractive index (N) | an Abbe number(v) |
|---|---|---|---|---|
| 1 | 22.176 | 2.16 | 1.84666 | 23.8 |
| 2 | ∞ | 0.80 | 1.53172 | 48.8 |
| 3 | 8.641 | variable | | |
| 4 | −20.513 | 1.00 | 1.49200 | 57.4 |
| 5 | 106.938 | variable | | |
| 6 | −106.938 | 1.00 | 1.49200 | 57.4 |
| 7 | −38.542 | 0.10 | | |
| 8 | 21.393 | 4.42 | 1.48749 | 70.4 |
| 9 | −7.692 | 0.80 | 1.84666 | 23.8 |
| 10 | −10.200 | variable | | |
| 11 | 13.602 | 4.50 | 1.49200 | 57.4 |
| 12 | 34.704 | 5.13 | | |
| 13 | ∞ | 26.40 | 1.51680 | 64.2 |
| 14 | ∞ | 2.20 | | |
| 15 | 30.292 | 4.47 | 1.67003 | 47.2 |

TABLE 4-continued

| surface number | radius of a curvature | thickness (d) | refractive index (N) | an Abbe number(v) |
|---|---|---|---|---|
| 16 | −8.184 | 1.00 | 1.74077 | 27.8 |
| 17 | −24.237 | 19.00 | | |
| 18 | ∞ | | | |

In the fourth preferred embodiment of the present invention, the above-mentioned thickness of lens or distance between lenses vary according to a view angle as follows.

| | 2w = 54.2° | 2w = 27.8° | 2w = 23.7° |
|---|---|---|---|
| d3 | 3.349 | 9.395 | 8.494 |
| d5 | 18.972 | 8.377 | 2.000 |
| d8 | 15.286 | 19.836 | 27.111 |
| | aspherical coefficient of the fifth surface | aspherical coefficient of the sixth surface | aspherical coefficient of the ninth surface |
| K | 0.41931376E+3 | −0.70554042E+2 | −0.18304920 |
| A4 | −0.1723162BE−3 | −0.22960926E−3 | −0.21826019E−3 |
| A6 | 0.37534386E−5 | 0.43988689E−S | 0.11291829E−4 |
| A8 | −0.20613980E−6 | −0.16777814E−6 | −0.56362619E−6 |
| A10 | 0.28579942E−8 | 0.14003472E−8 | 0.79546903E−8 |

Consequently, a real image finder optical system in accordance with the preferred embodiments of the present invention, with a compact and relatively simple structure, obtains a wide angle view field and compensates for chromatic aberration using a cemented lens.

Accordingly, the present invention provides a variable magnification finder with an acceptable aberration performance throughout the entire range, from an optical angle range to a telescope range, even though it has high magnification.

What is claimed is:

1. A variable magnification finder, comprising:

an objective lens group having a positive refractive power for enabling a wide angle view of an object, said group comprising a plurality of sequentially disposed lens sub-groups including:
 a first lens sub-group having a negative refractive power, and having a convex entrance surface toward the object,
 a second lens sub-group having a negative refractive power,
 a third lens sub-group having a positive refractive power and having a cemented lens with at least two pieces,
 a fourth lens sub-group having a positive refractive power;

an eyepiece lens group having a positive refractive power for viewing the image; and a prism between the objective lens group and the eyepiece lens group, wherein the third lens sub-group is movable for magnifying the image, and the second lens sub-group is movable for compensating focus variation of the magnified image caused by moving the third lens sub-group, wherein the first and fourth lens sub-groups are fixed during magnifying, and wherein each of the first, second, third, and fourth lens sub-groups comprises not more than three lenses.

2. The variable magnification finder of claim 1, wherein said cemented lens of the third lens group includes two plastic lenses.

3. The variable magnification finder of claim 1, wherein said cemented lens of the third lens group includes a glass lens and a plastic lens.

4. The variable magnification finder of claim 1, wherein said cemented lens of the third lens group includes two glass lenses.

5. The variable magnification finder of claim 4, wherein said third lens group further includes a plastic lens.

6. The variable magnification finder of claim 1, wherein said eyepiece lens group includes a cemented lens having at least two pieces.

* * * * *